(12) United States Patent
Chikkanna

(10) Patent No.: US 10,043,174 B1
(45) Date of Patent: Aug. 7, 2018

(54) BITCOIN TRANSACTION USING TEXT MESSAGE

(71) Applicant: Manu Chikkanna, Bangalore (IN)

(72) Inventor: Manu Chikkanna, Bangalore (IN)

(73) Assignee: INTUIT INC., Mountain View, CA (US)

( * ) Notice: Subject to any disclaimer, the term of this patent is extended or adjusted under 35 U.S.C. 154(b) by 865 days.

(21) Appl. No.: 14/304,749

(22) Filed: Jun. 13, 2014

(51) Int. Cl.
*G06Q 20/36* (2012.01)
*G06Q 20/32* (2012.01)
*G06Q 20/40* (2012.01)

(52) U.S. Cl.
CPC ......... *G06Q 20/3255* (2013.01); *G06Q 20/36* (2013.01); *G06Q 20/3676* (2013.01); *G06Q 20/401* (2013.01)

(58) Field of Classification Search
None
See application file for complete search history.

(56) References Cited

U.S. PATENT DOCUMENTS

| | | | |
|---|---|---|---|
| 7,089,208 B1* | 8/2006 | Levchin | G06Q 20/02 705/35 |
| 2007/0255620 A1* | 11/2007 | Tumminaro | G06Q 20/10 705/14.27 |
| 2009/0171837 A1* | 7/2009 | Moreno | G06Q 20/102 705/40 |
| 2011/0055084 A1* | 3/2011 | Singh | G06Q 20/1085 705/43 |
| 2013/0132219 A1* | 5/2013 | Liberty | G06Q 20/202 705/21 |
| 2013/0253993 A1* | 9/2013 | Brower | G06Q 20/22 705/12 |
| 2015/0006388 A1* | 1/2015 | Myers | G06Q 20/40 705/44 |
| 2015/0287026 A1* | 10/2015 | Yang | G06Q 20/3678 705/69 |
| 2015/0356555 A1* | 12/2015 | Pennanen | G06Q 20/06 705/71 |

FOREIGN PATENT DOCUMENTS

EP 1150262 A2 * 10/2001 ............. G06Q 20/04

* cited by examiner

*Primary Examiner* — John W Hayes
*Assistant Examiner* — Jason B Fenstermacher
(74) *Attorney, Agent, or Firm* — Ferguson Braswell Fraser Kubasta PC

(57) ABSTRACT

A method for processing payment. The method includes receiving, by a payment service, a payment text message comprising a payment amount and an identifier of a payee mobile device, validating the payment text message based on a payer balance of a virtual payer account maintained by the payment service for the payer, creating, by the payment service and in response to the payment text message, a virtual payee account based on the identifier of the payee mobile device, transferring, in response to creating the virtual payee account, the payment amount from the virtual payer account to the virtual payee account, and sending, by the payment service to the payee mobile device, a notification text message to notify the payee regarding a payee balance of the virtual payee account, wherein the payee balance is determined based at least on the payment amount.

21 Claims, 11 Drawing Sheets

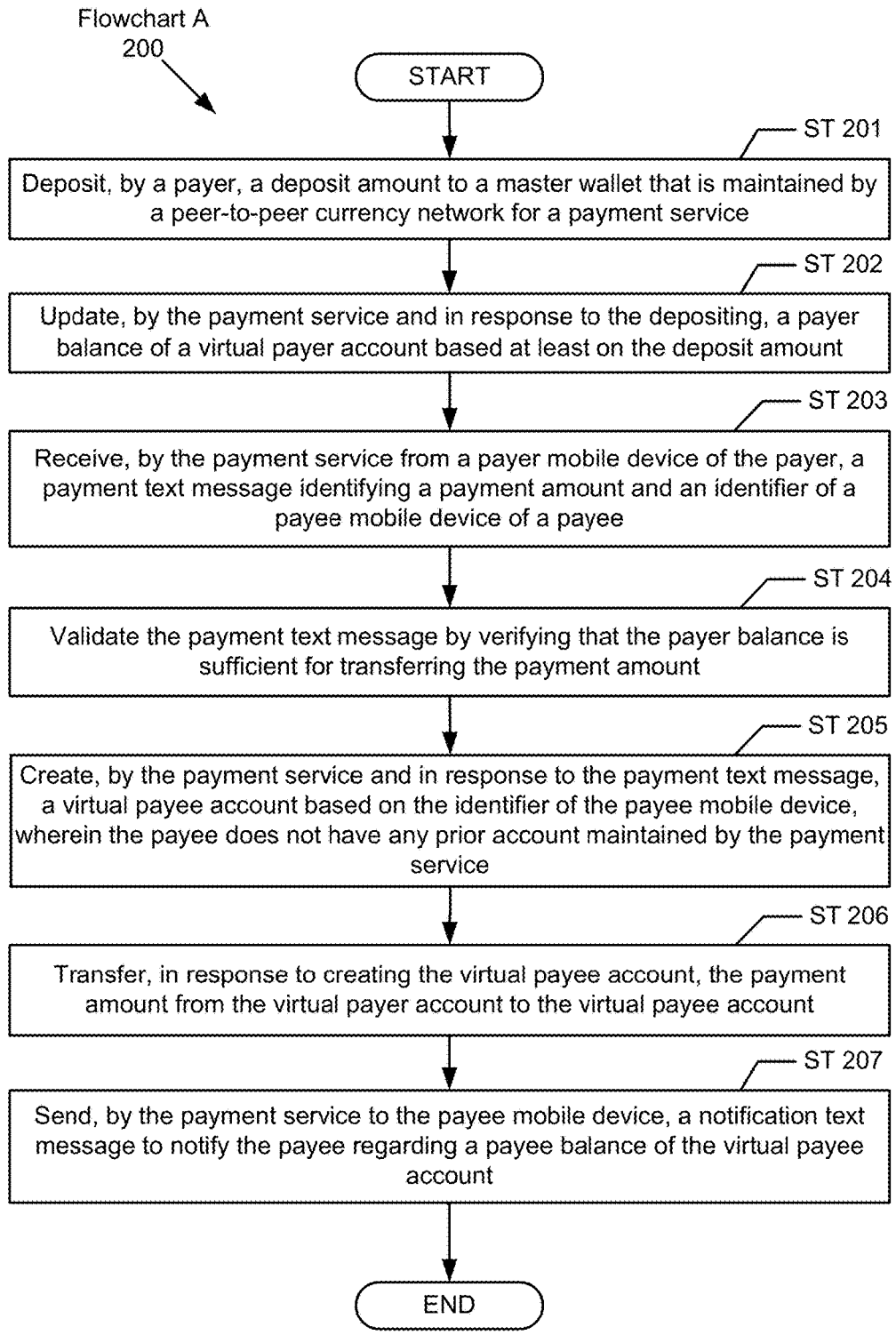
FIG. 2.1

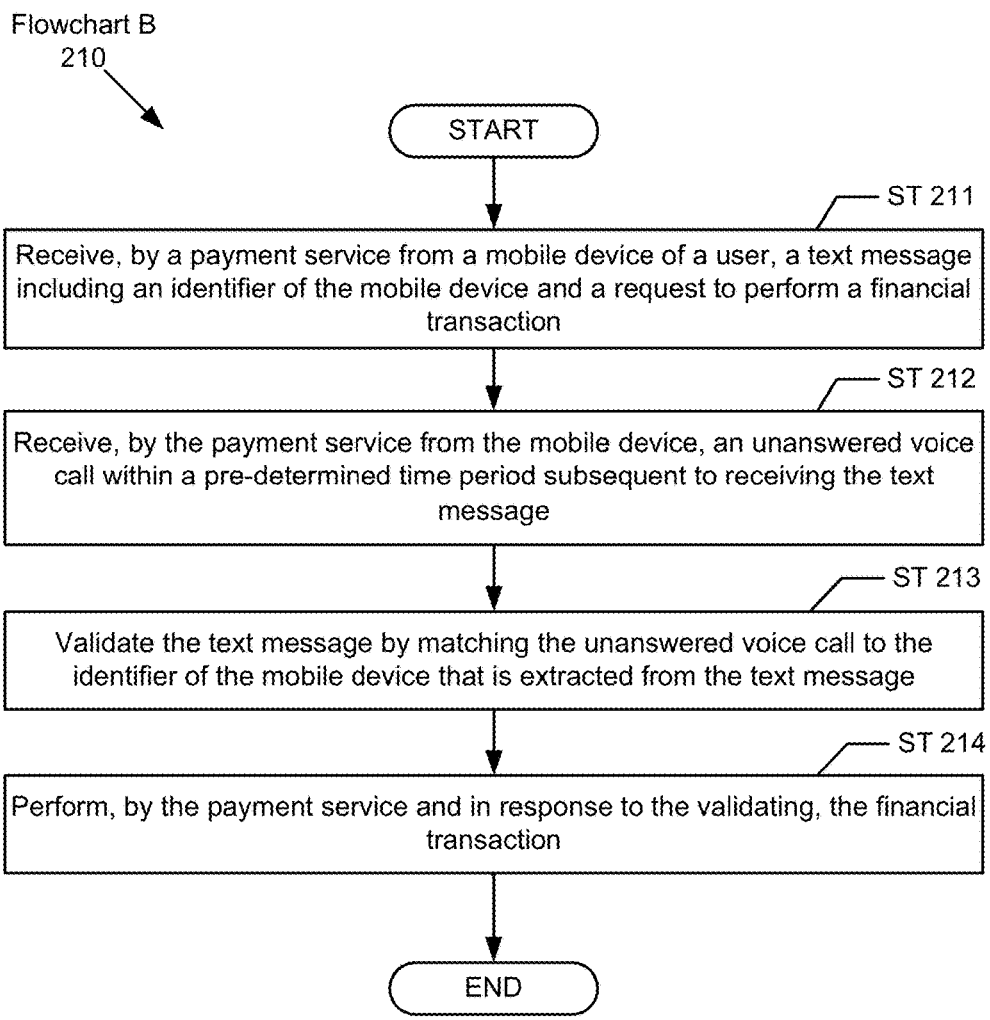
FIG. 2.2

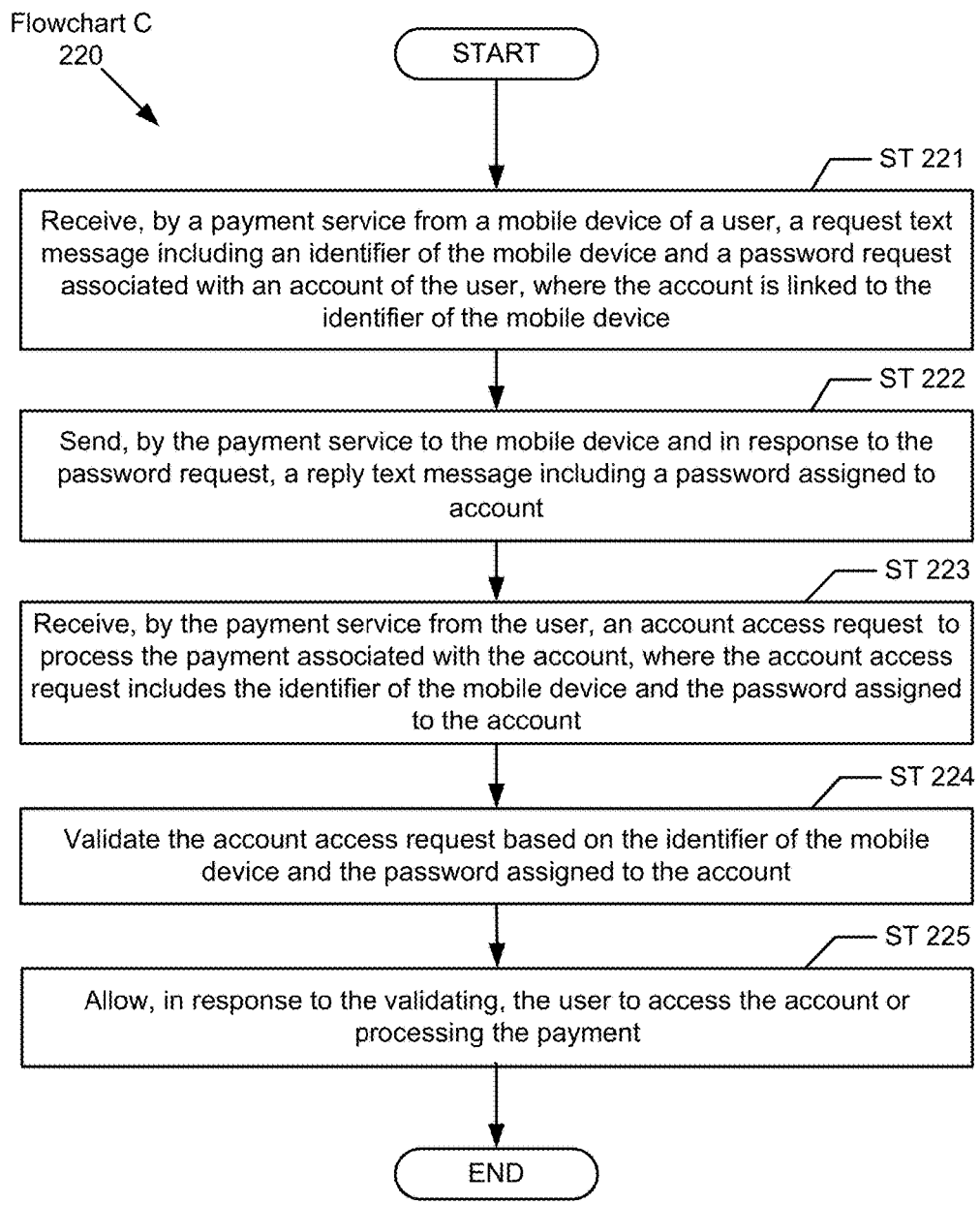
FIG. 2.3

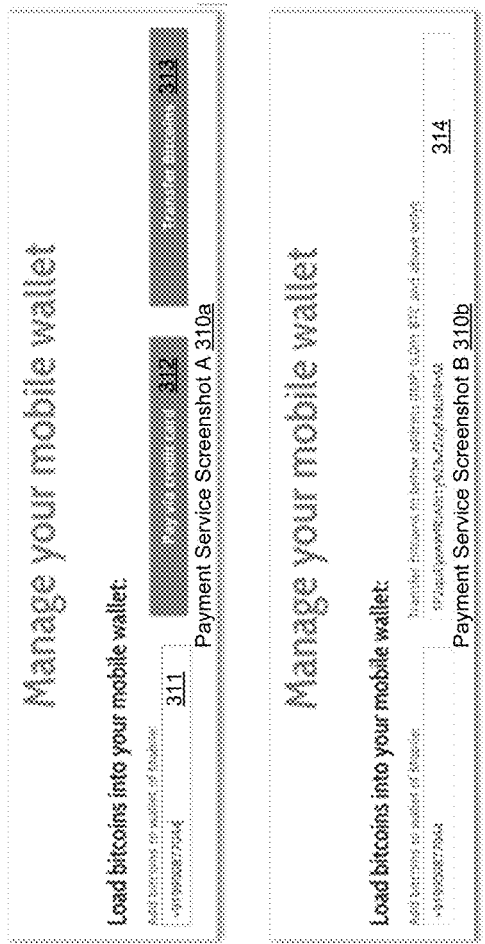
FIG. 3.1
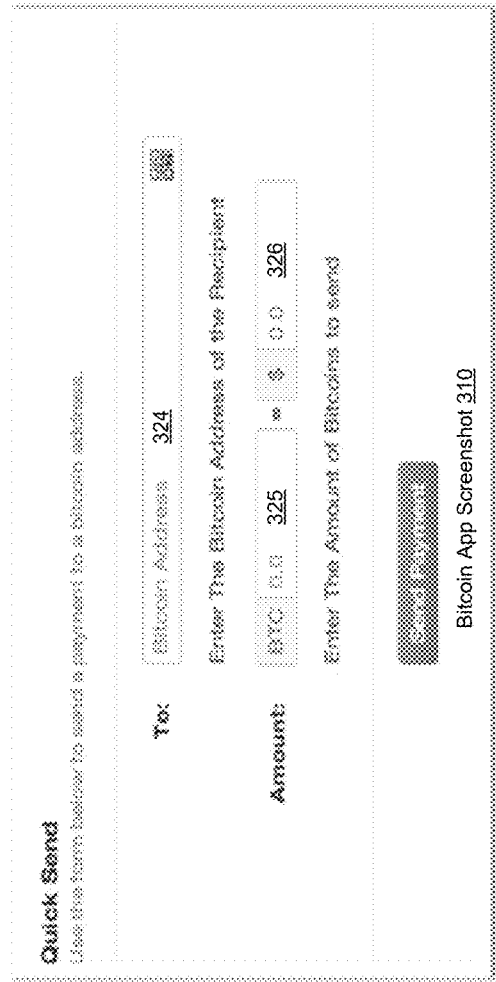
FIG. 3.2

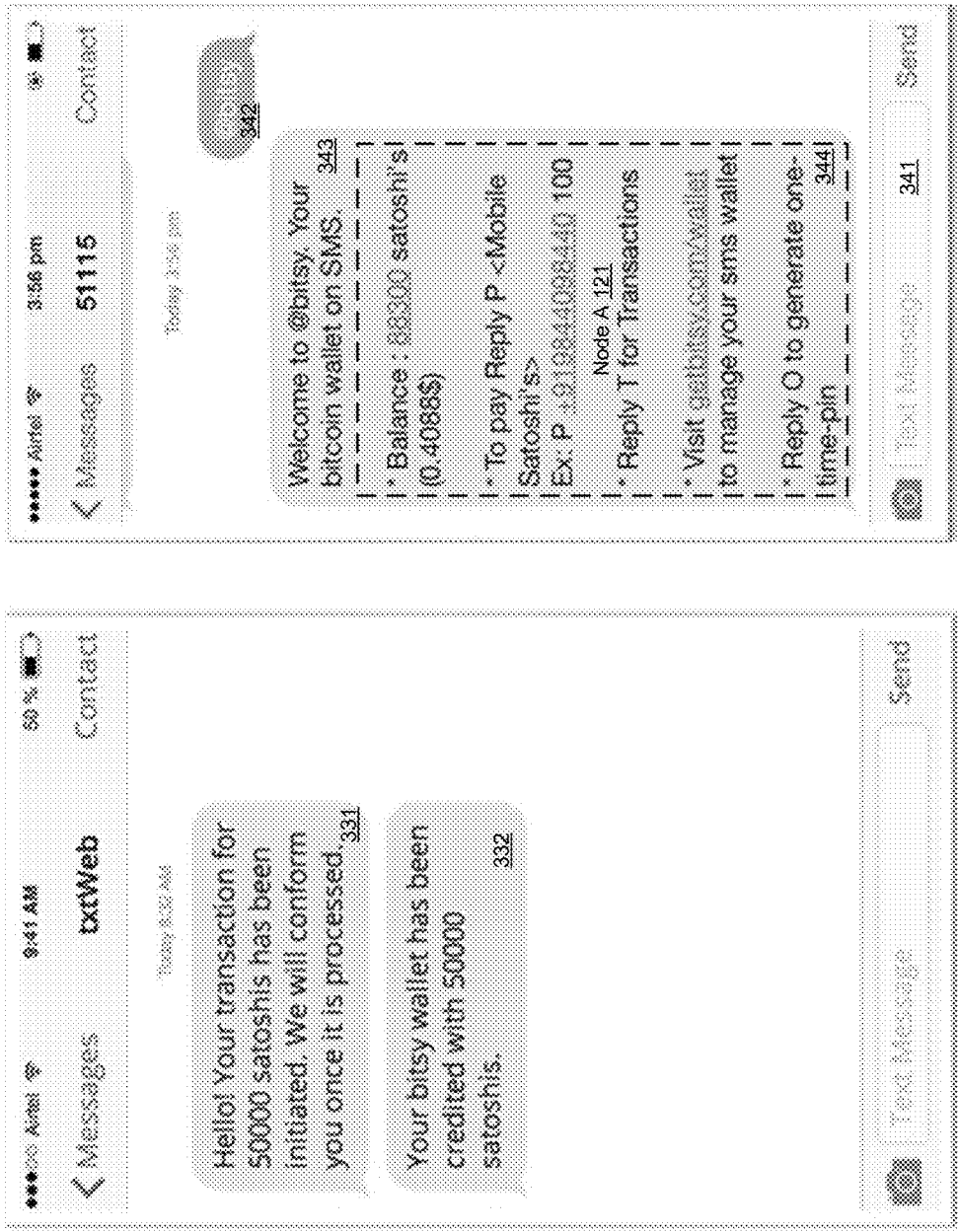
FIG. 3.4
FIG. 3.3

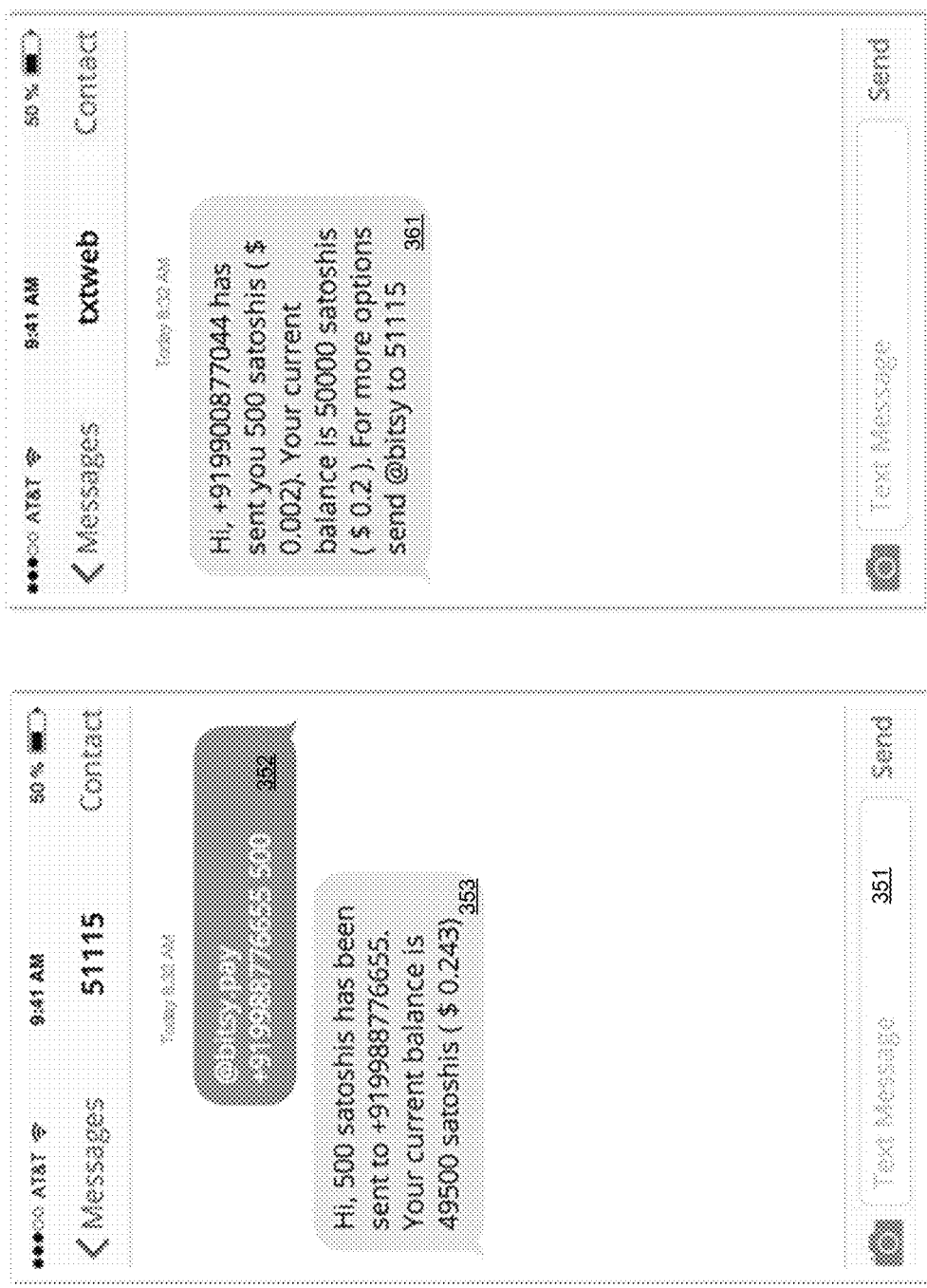
FIG. 3.5
FIG. 3.6

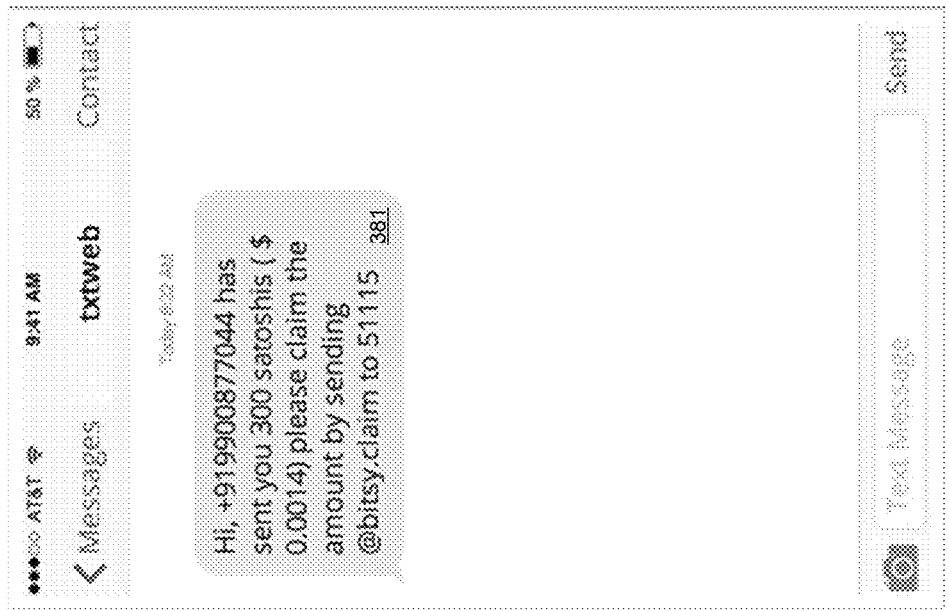
FIG. 3.8
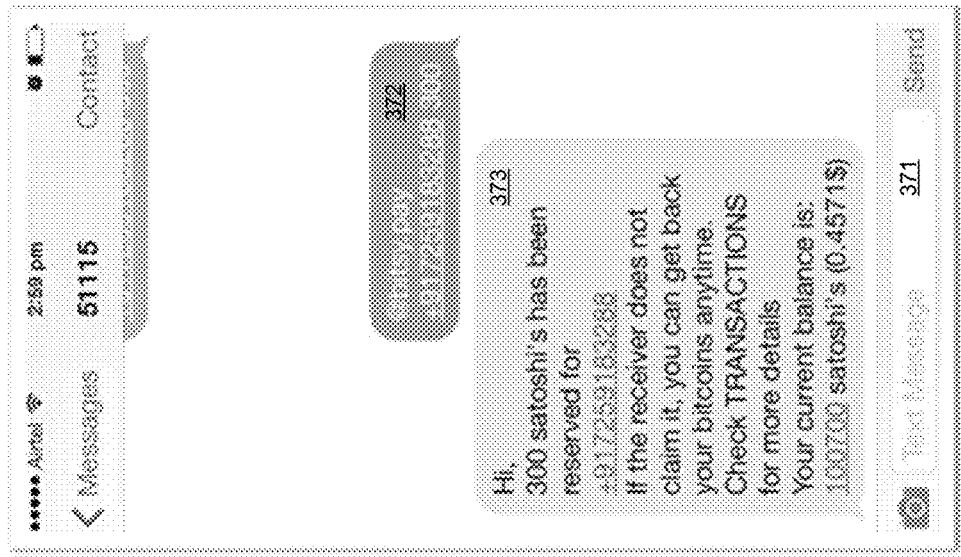
FIG. 3.7

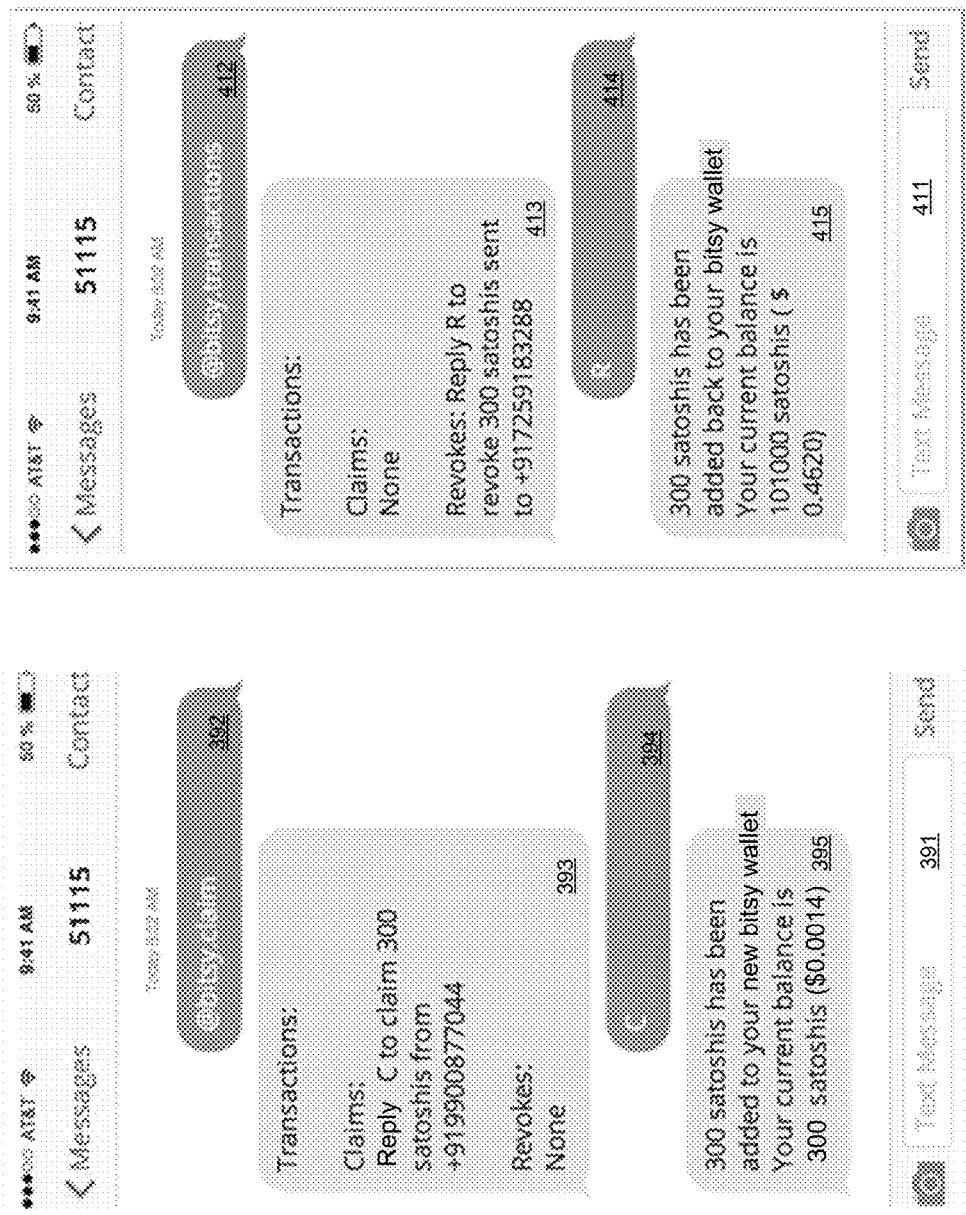
FIG. 3.9
FIG. 3.10

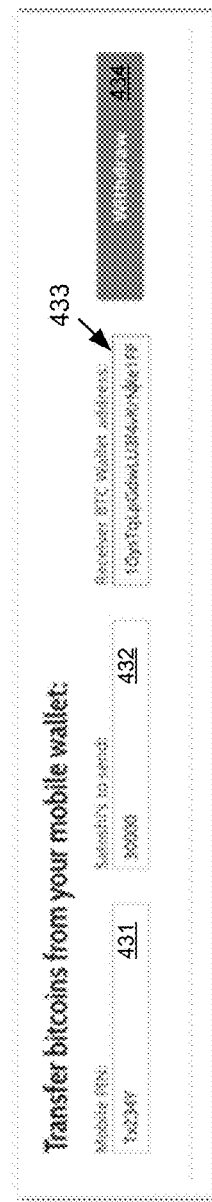
FIG. 3.11 FIG. 3.12 FIG. 3.13

BITCOIN TRANSACTION USING TEXT MESSAGE

BACKGROUND

The Bitcoin network is a peer-to-peer virtual currency network that operates on a cryptographic protocol. While "Bitcoin" refers to the virtual currency network, "bitcoin" refers to the underlying unit of virtual currency. Users send bitcoins by broadcasting digitally signed messages to the network using Bitcoin wallet software. Transactions are recorded into a distributed public database known as the block chain, with consensus achieved by a proof-of-work system referred to as "mining". The block chain is distributed internationally using peer-to-peer file sharing technology. The protocol was designed in 2008 and released in 2009 as open source software by "Satoshi Nakamoto," the pseudonym of the original developer or group of developers.

The block chain cannot be changed without redoing the work that was required to create each block downstream to the modified block. The longest chain serves not only as proof of the sequence of transaction events but also records that this sequence of events was verified by a majority of the Bitcoin network's computing power. As long as a majority of Bitcoin network's computing power is controlled by nodes that are not cooperating to attack the Bitcoin network, the non-malicious majority of the Bitcoin network will generate the longest chain of records and outpace attackers.

Fungibility is the characteristics of a good or a commodity whose individual units are capable of mutual substitution. For example, since one ounce of gold is equivalent to any other ounce of gold, gold is fungible. Other fungible commodities include sweet crude oil, company shares, bonds, precious metals, and currencies. Although Bitcoins may be intended to be fungible, each bitcoin has its own distinct history and is not truly fungible. The Internal Revenue Service (IRS) decided in March 2014, that bitcoin and other virtual currencies are treated as property, instead of currency for IRS purposes. To the extent that bitcoins are not truly fungible, bitcoins are not the same as a currency for IRS purposes.

Today's cellular phone services allow users using mobile devices, such as cellular phones, to send and receive messages using a text messaging service, such as SMS (i.e., Simple Messaging Service), MMS (i.e., multimedia messaging service), etc. Certain cellular phones (referred to as smartphones) are equipped with Internet browsing capability in addition to the text messaging capability. The Internet browsing is typically offered by Internet service providers as a subscribed service, referred to as a data plan or Internet data plan. For example, the cellular phone service providers may provide wireless data plans using wireless Internet connections. Other service providers may provide wired data plans using wired Internet connections. Having an Internet data plan subscription and in an area with proper wired or wireless Internet coverage, a user is provided with web browsing capability to access the Internet.

SUMMARY

In general, in one aspect, the invention relates to a method for processing payment. The method includes receiving, by a payment service from a payer mobile device of a payer, a payment text message comprising a payment amount and an identifier of a payee mobile device of a payee, validating the payment text message based at least on a payer balance of a virtual payer account maintained by the payment service for the payer, creating, by a computer processor of the payment service and in response to the payment text message, a virtual payee account based on the identifier of the payee mobile device, wherein the payee does not have any prior account maintained by the payment service, transferring, by the computer processor and in response to creating the virtual payee account, the payment amount from the virtual payer account to the virtual payee account, and sending, by the payment service to the payee mobile device, a notification text message to notify the payee regarding a payee balance of the virtual payee account, wherein the payee balance is determined based at least on the payment amount.

In general, in one aspect, the invention relates to a method for processing payment. The method includes receiving, by a payment service from a mobile device of a user, a text message comprising an identifier of the mobile device and a request to perform a financial transaction associated with the payment, receiving, by the payment service from the mobile device, an unanswered voice call within a pre-determined time period subsequent to receiving the text message, validating the text message by matching the unanswered voice call to the identifier of the mobile device that is extracted from the text message, and performing, by the payment service and in response to the validating, the financial transaction to process the payment.

In general, in one aspect, the invention relates to a method for processing payment. The method includes receiving, by a payment service from a mobile device of a user, a request text message comprising an identifier of the mobile device and a password request associated with an account of the user, wherein the account is linked to the identifier of the mobile device, sending, by the payment service to the mobile device and in response to the password request, a reply text message comprising a password assigned to account, receiving, by the payment service from the user, an account access request to process the payment associated with the account, wherein the account access request comprises the identifier of the mobile device and the password assigned to the account, validating the account access request based on the identifier of the mobile device and the password assigned to the account, and allowing, in response to the validating, the user to access the account or processing the payment.

In general, in one aspect, the invention relates to a system for processing payment. The system includes a payer mobile device of a payer, wherein the payer mobile device is configured to send to a payment text message to a payment service, wherein the payment text message comprises a payment amount and an identifier of a payee mobile device of a payee, a payment service configured to validate the payment text message based at least on a payer balance of a virtual payer account maintained by the payment service for the payer, create, in response to the payment text message, a virtual payee account based on the identifier of the payee mobile device, wherein the payee does not have any prior account maintained by the payment service, transfer, in response to creating the virtual payee account, the payment amount from the virtual payer account to the virtual payee account, and send, to the payee mobile device, a notification text message to notify the payee regarding a payee balance of the virtual payee account, wherein the payee balance is determined based at least on the payment amount, and the payee mobile device configured to receive the notification text message.

In general, in one aspect, the invention relates to a non-transitory computer readable medium storing instructions for processing payment. The instructions, when executed by a computer processor, includes functionality for receiving, by a payment service from a payer mobile device of a payer, a payment text message comprising a payment amount and an identifier of a payee mobile device of a payee, validating the payment text message based at least on a payer balance of a virtual payer account maintained by the payment service for the payer, creating, by the payment service and in response to the payment text message, a virtual payee account based on the identifier of the payee mobile device, wherein the payee does not have any prior account maintained by the payment service, transferring, in response to creating the virtual payee account, the payment amount from the virtual payer account to the virtual payee account, and sending, by the payment service to the payee mobile device, a notification text message to notify the payee regarding a payee balance of the virtual payee account, wherein the payee balance is determined based at least on the payment amount.

Other aspects of the invention will be apparent from the following transaction description and the appended claims.

BRIEF DESCRIPTION OF DRAWINGS

FIGS. 2.1, 2.2, and 2.3 show method flowcharts in accordance with one or more embodiments of the invention.

FIGS. 3.1, 3.2, 3.3, 3.4, 3.5, 3.6, 3.7, 3.8, 3.9, 3.10, 3.11, 3.12, and 3.13 show an example in accordance with one or more embodiments of the invention.

DETAILED DESCRIPTION

Figure 1:
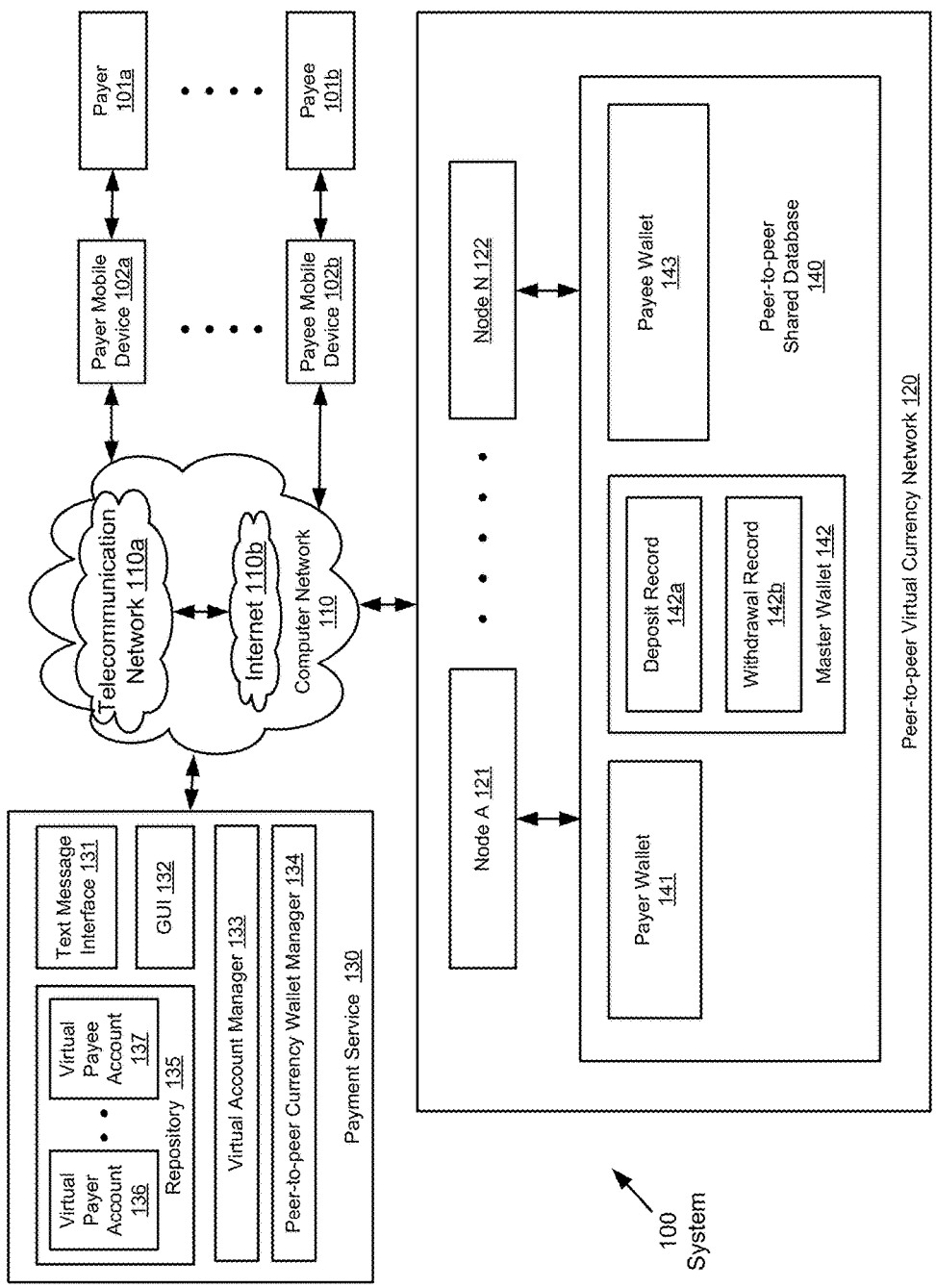
FIG. 1 shows a block diagram of a system in accordance with one or more embodiments of the invention.

Specific embodiments of the invention will now be described in detail with reference to the accompanying figures. Like elements in the various figures are denoted by like reference numerals for consistency. Further, in the figures, three collinear dots mean that more elements of the same type as before the three collinear dots may optionally exist in accordance with one or more embodiments of the invention.

In the following detailed transaction description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the transaction description.

Embodiments of the invention provide a method, system, and computer readable medium (CRM) for allowing anyone with a mobile device to send and/or receive payments globally. For example, the payment may be sent or received by a user without an Internet data plan or at a location with no access to the Internet. In one or more embodiments, the payment is based on a virtual currency, such as the bitcoin.

FIG. 1 shows a block diagram of a system (100) in accordance with one or more embodiments of the invention. Specifically, the system (100) includes a payer (101a) having a payer mobile device (102a), a payee (101b) having a payee mobile device (102b), a payment service (130), and a peer-to-peer virtual currency network (120) that are coupled via a computer network (110). In addition, the payment service (130) includes a text message interface (131), a graphical user interface (GUI) (132), a virtual account manager (133), a peer-to-peer currency wallet manager (134), and a repository (135) storing a virtual payer account (136) of the payer (101a) and a virtual payee account (137) of the payee (101b). Further, the peer-to-peer virtual currency network (120) includes multiple computing nodes (e.g., node A (121), node N (122), etc.) collectively maintaining a peer-to-peer shared database (140). Specifically, the peer-to-peer shared database (140) stores peer-to-peer virtual currency wallets, such as the payer wallet (141) of the payer (101a), the payee wallet (143) of the payee (101b), and the master wallet (142) of the payment service (130). In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

In one or more embodiments of the invention, the payer (101a) is a person or group (e.g., family or other organization) that makes a payment to another person or group (e.g., payee (101b)). The payee (101b) is a person or group that receives a payment from another person or group (e.g., payer (101a)). In one or more embodiments, the payer (101a) may be making the payment for a personal purpose or on behalf of a business. Similarly, the payee (101b) may be receiving the payment for a personal purpose or on behalf of a business. For example, the payer (101a) and/or the payee (101b) may be an owner, agent, or officer of the business. In one or more embodiments of the invention, the payer (101a) and the payee (101b) are users of the payment service (130) and the peer-to-peer virtual currency network (120).

In one or more embodiments of the invention, the computer network (110) includes a telecommunication network (110a) (e.g., a cellular phone network, a public switched telephone network (PSTN), etc.), a wide area network, a local area network, or any other suitable network that facilitates the exchange of messages from one part of the network to another. In one or more embodiments, the computer network (110) is coupled to or overlap with the Internet (110b). In one or more embodiments, the payer (101a), the payee (101b), the payment service (130), and the peer-to-peer virtual currency network may include any computing device configured with computing, data storage, and network communication functionalities.

In one or more embodiments, the computing devices used by the payer (101a) and the payee (101b) includes the payer mobile device (102a) and the payee mobile device (102b), which may be a cellular phone, a smartphone, a tablet, a pad device, a gaming device, a personal digital assistant, or any other suitable mobile device that includes text messaging functionality. In one or more embodiments, the payer (101a) and the payee (101b) use the payer mobile device (102a) and the payee mobile device (102b), respectively, to exchange text messages with the payment service (130) via the telecommunication network (110a) for sending and receiving payments and performing other related tasks. For example, the text messages may be based on SMS (i.e., Simple Messaging Service), MMS (i.e., multimedia messaging service), Unstructured Supplementary Service Data (USSD) protocol, Internet chat, online messenger, other text messaging service known to those skilled in the art, or any text messaging service that may be developed in the future. Further, the text messages may be exchanged via the telecommunication network (110a), the Internet (110b), or a combination thereof. Further, the text messages may be exchanged using a native mobile application executing on the payer mobile device (102a) and/or the payee mobile device (102b).

In one or more embodiments of the invention, the peer-to-peer virtual currency network (120) is a decentralized and distributed network of computing nodes (e.g., node A (121), node N (122), etc.) collectively maintaining the peer-to-peer shared database (140) using a security protocol to create, transfer, and track virtual currency units for users, such as the payer (101a), the payee (101b), the payment service (130), etc. In particular, in one or more embodiments, the peer-to-peer shared database (140) includes peer-to-peer file sharing functionality for the computing nodes to collectively perform various tasks required in creating, transferring, and tracking the virtual currency units. In one or more embodiments, the peer-to-peer virtual currency network (120) includes the functionality to maintain user wallets, which are data structures in the peer-to-peer shared database (140) for storing individual user's virtual currency. For example, the user wallets may include a payer wallet (141) for the payer (101a), a master wallet (142) for the payment service (130), and a payee wallet (143) for the payee (101b). Specifically, the master wallet (142) includes a peer-to-peer file sharing data structure assigned to the payment service (130) for storing virtual currency of the payment service (130). Similarly, the payer wallet (141) and the payee wallet (143) include peer-to-peer file sharing data structures assigned to the payer (101a) and the payee (101b), respectively, for storing virtual currency of the payer (101a) and the payee (101b)).

In one or more embodiments of the invention, the payer (101a) makes an initial deposit to the master wallet (142) before the payer (101a) may send any payment using the payment service (130). Specifically, the payer (101a) accesses the peer-to-peer virtual currency network (120) and transfers certain amount (referred to as a deposit amount) of virtual currency to the master wallet (142) for making the initial deposit. As a result, a digitally signed message (i.e., deposit record (142a)) representing the deposit amount in virtual currency is stored in the master wallet (142). In addition, the digitally signed message (i.e., deposit record (142a)) is broadcasted to the node A (121), node N (122), and other computing nodes according to the cryptographic protocol of the peer-to-peer virtual currency network (120).

In one or more embodiments of the invention, the payee (101b) receives a payment from the payer (101a) using the payment service (130). Accordingly, the payee (101b) accesses the peer-to-peer virtual currency network (120) and withdrawal a certain amount (referred to as a withdrawal amount) of virtual currency from the master wallet (142). As a result, a digitally signed message (i.e., withdrawal record (142b)) representing the withdrawal amount in virtual currency is stored in the master wallet (142). In addition, the digitally signed message (i.e., withdrawal record (142b)) is broadcasted to the node A (121), node N (122), and other computing nodes according to the cryptographic protocol of the peer-to-peer virtual currency network (120).

In one or more embodiments of the invention, the peer-to-peer virtual currency network (120) includes the Bitcoin network. In such embodiments, the peer-to-peer shared database (140) stores the block chain of the Bitcoin network and bicoin wallets of the users, such as the payer wallet (141), the master wallet (142), and the payee wallet (143).

In one or more embodiments of the invention, the payment service (130) includes software and/or hardware components with the functionality to perform payment tasks based on financial accounts maintained by the payment service (130). Specifically, each individual financial account is maintained by the payment service (130) for recording a balance and deposit/withdrawal activities of the account holder. In one or more embodiments, the balance and deposit/withdrawal activities are based on a non-fungible financial property, such as a virtual currency. In such embodiments, the non-fungible financial property may be the virtual currency created, transferred, and tracked in the peer-to-peer virtual currency network (120). In other embodiments, the balance and deposit/withdrawal activities may be based on a real currency, such as the U.S. dollar. In one or more embodiments, the financial accounts include the virtual payer account (136) of the payer (101a) and the virtual payee account (137) of the payee (101b) that are stored in the repository (135) of the payment service (130). In those embodiments where these financial accounts are based on a virtual currency, the virtual payer account (136) and the virtual payee account (137) may be linked to the payer wallet (141) and the payee wallet (143), respectively. In other embodiments where these financial accounts are based on a real currency, the virtual payer account (136) and the virtual payee account (137) may be linked to additional financial accounts maintained by other financial institution (not shown) for the payer (101a) and the payee (101b). In one or more embodiments of the invention, the payment service (130) is operated by a business referred to as a payment service provider.

In one or more embodiments of the invention, the payment service (130) includes the virtual account manager (133) that is configured to create, update, and otherwise manage the virtual payer account (136) and the virtual payee account (137). For example, the virtual account manager (133) may exchange messages with the payer (101a) and the payee (101b) regarding account activities, such as account creation, payment, balance inquiry, or other types of account activities. In one or more embodiments, at least a portion of the exchanged messages are text messages, such as SMS or MMS messages based on the telecommunication network (110a). Additional details of how the virtual account manager (133) manages the virtual payer account (136) and the virtual payee account (137) are described in reference to FIGS. 2.1-2.3 and FIGS. 3.1-3.11 below.

In one or more embodiments of the invention, the payment service (130) includes the peer-to-peer currency wallet manager (134) that is configured to perform deposit/withdrawal tasks that involve the peer-to-peer currency network (120). For example, the peer-to-peer currency wallet manager (134) may send messages to the payer (101a) and/or the payee (101b) providing information of the master wallet (142) to facilitate making a deposit. Additionally, the peer-to-peer currency wallet manager (134) may initiate virtual currency transfers from the master wallet (142) to the payer wallet (141) and/or the payee wallet (143) in response to withdrawal requests from the payer (101a) and/or the payee (101b). In one or more embodiments, at least a portion of the notification/reply messages associated with the virtual currency deposit/withdrawal are text messages, such as SMS or MMS messages based on the telecommunication network (110a). Additional details of how the peer-to-peer currency wallet manager (134) performs deposit/withdrawal tasks using the peer-to-peer currency network (120) are described in reference to FIGS. 2.1-2.3 and FIGS. 3.1-3.11 below.

In one or more embodiments of the invention, the payment service (130) includes the text message interface (131) that is configured to send and receive text messages to/from the payer mobile device (102a) and/or the payee mobile device (102b) as directed by the peer-to-peer currency wallet manager (134) and the virtual account manager (133). In one or more embodiments of the invention, the payment service (130) includes the graphical user interface (GUI) (132) that supplements the text message interface (131) to allow the payer (101a) and/or the payee (101b) to interact with the peer-to-peer currency wallet manager (134) and the virtual account manager (133). In one or more embodiments, the GUI (132) is a browser based interface. For example, the GUI (132) allows the payer (101a) and/or the payee (101b) to access a website of the payment service (130) for accessing functionalities of the peer-to-peer currency wallet manager (134) and the virtual account manager (133). The payer (101a) and/or the payee (101b) may access the website of the payment service (130) using the payer mobile device (102a) and/or the payee mobile device (102b) if an Internet data plan and Internet coverage are available. Alternatively, the payer (101a) and/or the payee (101b) may access the website of the payment service (130) using other computing devices (e.g., desktop computer, tablet computer, etc., not shown) connected to the Internet (110b) if no Internet data plan is available on the payer mobile device (102a) and/or the payee mobile device (102b). Additional details of how the text message interface (131) and the GUI (132) facilitate user interaction with the peer-to-peer currency wallet manager (134) and the virtual account manager (133) are described in reference to FIGS. 2.1-2.3 and FIGS. 3.1-3.11 below.

FIG. 2.1 shows a method flowchart A (200) in accordance with one or more embodiments of the invention. In one or more embodiments of the invention, the method of FIG. 2.1 may be practiced using the system (100) described in reference to FIG. 1 above. In one or more embodiments of the invention, one or more of the steps shown in FIG. 2.1 may be omitted, repeated, and/or performed in a different order than that shown in FIG. 2.1. Accordingly, the specific arrangement of steps shown in FIG. 2.1 should not be construed as limiting the scope of the invention.

Initially in Step 201, a deposit amount is deposited by a payer to a master wallet that is maintained by a peer-to-peer virtual currency network for a payment service. In particular, the master wallet includes a peer-to-peer file sharing data structure assigned to the payment service for storing virtual currency of the payment service. As a result of the deposit by the payer, the master wallet stores a digitally signed message that is broadcasted to the peer-to-peer virtual currency network representing the deposit amount in virtual currency. In one or more embodiments, the deposit amount is deposited to the master wallet via a one time wallet linked to a payer mobile device of the payer. In addition, the payment service maintains a virtual payer account that is identified by the mobile phone number of the payer mobile device. Accordingly, the deposit is properly credited to the payer based on the one time wallet and the linked virtual payer account. In one or more embodiments, the peer-to-peer virtual currency network is the Bitcoin network and the virtual currency is the bitcoin.

In Step 202, in response to the payer depositing the deposit amount of virtual currency, the payment service updates a payer balance of the virtual payer account maintained by the payment service for the payer. Specifically, the update is based at least on the deposit amount. In other words, the initial balance is increased by the deposit amount (less any applicable fees) to show an updated balance in the virtual payer account. In one or more embodiments, the payment service identifies the virtual payer account based on the linked one time wallet. Accordingly, the virtual payer account is properly credited based on the link between the one time wallet and the virtual payer account.

In Step 203, a payment text message is receive by the payment service from a payer mobile device of the payer. Specifically, the payment text message includes a payment amount and an identifier of a payee mobile device of a payee. In one or more embodiments, the identifier is the mobile phone number of the payee mobile device. In one or more embodiments, the mobile phone number of the payer is extracted from metadata of the payment text message and used to identify the virtual payer account. In one or more embodiments, the payment amount is a fractional bitcoin where direct fractional bitcoin transaction may not be possible or may impose an impractical transaction fee in the Bitcoin network. For example, the Bitcoin network imposed transaction fee may exceed the value of the fractional bitcoin.

In Step 204, subsequent to updating the payer balance (in Step 202) and in response to the payment text message (in Step 203), the payment service verifies that the payer balance is sufficient for transferring the payment amount. Accordingly, the payment text message is validated.

In Step 205, in response to validating the payment text message, the payment service creates a virtual payee account based on the identifier of the payee mobile device. Specifically, the virtual payee account is created and maintained by the payment service for the payee. In one or more embodiments, the payee does not have any prior account maintained by the payment service.

In Step 206, in response to creating the virtual payee account, the payment service transfers the payment amount from the virtual payer account to the virtual payee account. As a result, the virtual payee account shows a payee balance based on the payment amount. Certain applicable fees may be deducted from the payment amount to determine the payee balance. In those embodiments where the payment amount may be a fractional bitcoin, updating the virtual payee account based on the fractional bitcoin payment mitigates the limitation of direct fractional bitcoin transaction in the Bitcoin network. For example, multiple fractional bitcoin payments may be aggregated into a full bitcoin amount in the virtual payee account before a bitcoin transaction linked to the virtual payee account is performed in the Bitcoin network. In particular, the Bitcoin network imposed transaction fee no longer exceeds the value of the full bitcoin amount. In one or more embodiments, the bitcoin transaction linked to the virtual payee account is performed in the Bitcoin network when it is determined that the Bitcoin network imposed transaction fee is within a pre-determined acceptable percentage of the value of the full bitcoin amount.

In Step 207, the payment service sends a notification text message to the payee mobile device. Specifically, the notification text message notifies the payee regarding the payee balance of the virtual payee account. In one or more embodiments, the payee proceeds to claim the funds in the virtual payee account. For example, the payee may redeem funds from the virtual payee account into a equivalent amount of bitcoin. Specifically, the redeemed amount of bitcoin is transferred from the master wallet of the payment service to a payee wallet of the payee in the Bitcoin network. In one or more embodiments, the payee does not claim the funds in the virtual payee account. In such embodiments, the payer may reclaim (i.e., cancel or reverse) the payment.

FIG. 2.2 shows a method flowchart B (210) in accordance with one or more embodiments of the invention. In one or more embodiments of the invention, the method of FIG. 2.2 may be practiced using the system (100) described in reference to FIG. 1 above. In one or more embodiments of the invention, one or more of the steps shown in FIG. 2.2 may be omitted, repeated, and/or performed in a different order than that shown in FIG. 2.2. Accordingly, the specific arrangement of steps shown in FIG. 2.2 should not be construed as limiting the scope of the invention.

Initially in Step 211, a payment service receives a text message from a mobile device of a user. Specifically, the text message includes an identifier of the mobile device and a request to perform a financial transaction. In one or more embodiments, the identifier of the mobile device is a mobile phone number contained in metadata of the text message. In one or more embodiments, the user is a payer requesting the financial transaction that pays a payee from a virtual payer account maintained by the payment service for the payer.

In one or more embodiments, the financial transaction is based on a virtual currency and the virtual payer account is linked to a virtual currency wallet of the payer that is maintained by a virtual currency network, such as a peer-to-peer virtual currency network.

In one or more embodiments, the financial transaction is based on a real currency and the virtual payer account is linked to a financial account of the payer that is maintained by a financial institution separate from any virtual currency network.

In one or more embodiments, the payment service is integrated within a financial institution and the virtual payer account is a real currency denominated financial account maintained by the financial institution for the payer.

In Step 212, the payment service receives an unanswered voice call from the mobile device within a pre-determined time period subsequent to receiving the text message. In one or more embodiments, the unanswered voice call is a voice phone call the is automatically disconnected by the payment service without answering.

In Step 213, the text message is validated by matching the unanswered voice call to the identifier of the mobile device that is extracted from the text message. In one or more embodiments, the payment service identifies the mobile phone number of the mobile device when the unanswered voice call is received from the mobile device. Accordingly, the mobile phone number identified from the unanswered voice call is compared to the identifier of the mobile device that is extracted from the text message. If a match is found by the comparison, the match confirms that the text message and the unanswered phone call both originate from the same mobile device of the user. This confirmation validates the text message. For example, the text message is confirmed to be intentionally sent by the payer instead of an un-intended random message or a spam message sent by a machine.

In Step 214, in response to validating the text message, the payment service performs the financial transaction. For example, performing the financial transaction may include processing a payment from a virtual currency wallet of the payer or from a real currency denominated financial account of the payer.

FIG. 2.3 shows a method flowchart C (220) in accordance with one or more embodiments of the invention. In one or more embodiments of the invention, the method of FIG. 2.3 may be practiced using the system (100) described in reference to FIG. 1 above. In one or more embodiments of the invention, one or more of the steps shown in FIG. 2.3 may be omitted, repeated, and/or performed in a different order than that shown in FIG. 2.3. Accordingly, the specific arrangement of steps shown in FIG. 2.3 should not be construed as limiting the scope of the invention.

Initially in Step 221, a payment service receives a request text message from a mobile device of a user. Specifically, the request text message includes an identifier of the mobile device and a password request associated with an account of the user. In one or more embodiments, the account is linked to the identifier of the mobile device. For example, the identifier of the mobile device may be the mobile phone number of the mobile device and the account is uniquely identified by the mobile phone number.

In Step 222, in response to the password request, the payment service sends a reply text message to the mobile device. Specifically, the reply text message includes a password assigned to account. In one or more embodiments, the password is an one time password that can be used only once to access the account.

In Step 223, the payment service receives an account access request from the user to process a payment associated with the account. Specifically, the account access request includes the identifier of the mobile device and the password assigned to the account. In one or more embodiments, the account access request is received via a graphical user interface of the payment service. For example, the graphical user interface may be part of a website operated by the payment service.

In Step 224, the account access request is validated based on the identifier of the mobile device and the password assigned to the account. In one or more embodiments, the possession of the password by the user confirms the user's possession of the mobile device that received the password. Based on an agreement between the user and the payment service, the possession of the mobile device allows the user to access the account that is uniquely identified by the identifier of the mobile device. (Step 225).

FIGS. 3.1, 3.2, 3.3, 3.4, 3.5, 3.6, 3.7, 3.8, 3.9, 3.10, 3.11, 3.12, and 3.13 show an example in accordance with one or more embodiments of the invention. In one or more embodiments of the invention, the example shown in FIGS. 3.1-3.13 may be practiced using the system (100) and method flowchart A (200), method flowchart B (210), and method flowchart C (220) described in reference to FIG. 1, FIG. 2.1, FIG. 2.2, and FIG. 2.3, respectively.

FIG. 3.1 shows a payment service screenshot A (310a) and a payment service screenshot B (310b) of a payer's computing device (e.g., a desktop computer or a tablet computer) when the payer accesses the payment service website to transfer funds to the payer's account (i.e., virtual payer account) held at the payment service. Specifically, the payment service screenshot A (310a) shows a data entry field (311) where the payer enters his/her mobile phone number that identifies the virtual payer account at the payment service. Further, the payment service screenshot A (310a) shows action buttons (312) and (313) where the payer may select a method to fund the virtual payer account. For example, if the payer clicks on the action button (313) to use the Bitcoin network to fund the virtual payer account, the payer is re-directed to another webpage of the payment service website represented by the payment service screenshot B (310b). Specifically, the payment service screenshot B (310b) shows a data display field (314) presenting the payer an one-time Bitcoin network address identifying a payment service's one-time Bitcoin wallet for the payer to deposit a desired amount (i.e., deposit amount) of bitcoins. The one-time Bitcoin network address displayed in the data display field (314) is linked to the mobile phone number entered into the data entry field (311) and therefore is also linked to the virtual payer account. In particular, another one-time Bitcoin network address will be presented to another payer for depositing funds into the payment service's another one-time Bitcoin wallet that is linked to the another payer's account at the payment service. Upon the payer viewing the one-time Bitcoin network address displayed in the data display field (314), the payer may use a Bitcoin application (e.g., shown in FIG. 3.2 below) to deposit the desired amount (i.e., deposit amount) of bitcoin to the payment service's one-time Bitcoin wallet for funding his/her virtual payer account at the payment service.

FIG. 3.2 shows a Bitcoin App screenshot (310) of the payer's computing device running a Bitcoin application when the payer accesses the Bitcoin network to deposit the desired amount of bitcoin to the payment service's one-time Bitcoin wallet. Specifically, the Bitcoin App screenshot (310) shows a data entry field (324) for the payer to enter the one-time Bitcoin network address displayed in the data display field (314) shown in FIG. 3.1 above. In addition, the Bitcoin App screenshot (310) shows another data entry field (325) for the payer to enter the amount (i.e., deposit amount) of the bitcoin for deposit. An equivalent amount in U.S. dollars is automatically calculated and displayed in the field (326). Once the specified amount of bitcoin is deposited into the payment service's one-time Bitcoin wallet, the deposited bitcoins may be transferred into a master wallet of the payment service maintained in the Bitcoin network. The payment service identifies the virtual payer account linked to the one-time Bitcoin wallet and credits the virtual payer account based on the deposit amount.

FIG. 3.3 shows a payer mobile device image displayed on the payer's mobile phone showing a text message (331) and another text message (332) after the payer deposited the bitcoin as shown in FIGS. 3.1 and 3.2 above. Specifically, the text message (331) is sent automatically from the payment service to notify the payer that transaction of the deposited amount (e.g., 50000 satochis) has been initiated. Subsequently, the text message (332) is sent automatically from the payment service to notify the payer that the virtual payer account (referred to as the bitsy wallet) has been credited the deposit amount. With the virtual payer account funded by the deposit amount, the payer may access additional functionality of the payment service using text messages.

FIG. 3.4 shows a payer mobile device image displayed on the payer's mobile phone showing a reply text message (343) sent from the payment service in response to the text message (342) sent by the payer to the payment service. Specifically, the text message (342) includes the keyword bitsy which requests a home page menu from the payment service. Accordingly, the reply text message (343) shows the home page menu (344) listing the current balance of the virtual payer account as well as additional keywords that can be used to access various function of the payment service.

FIG. 3.5 shows a payer mobile device image displayed on the payer's mobile phone showing a notification text message (353) sent from the payment service in response to the text message (352) sent by the payer to the payment service. Specifically, the text message (352) includes the keyword @bitsy.pay which requests to make a payment to a payee identified by the mobile phone number "919988776655" following the keyword @bitsy.pay. In particular, the payment amount is specified by the numerals "500" following the payee's mobile phone number. In this example, the payee is a registered user of the payment service. Accordingly, the notification text message (353) notifies the payer that 500 satoshis has been sent to the specified payee. In addition, the notification text message (353) includes the current balance of the virtual payer account after the payment amount is debited.

FIG. 3.6 shows a payee mobile device image displayed on the payee's mobile phone showing a notification text message (361) sent from the payment service. The notification text message (361) is sent using the payee's mobile phone number "919988776655" specified by the payer as shown in FIG. 3.5 above. The notification text message (361) notifies the payee regarding the payment sent from the payer. The notification text message (361) also includes an invitation for the payee to use the payment service's phone number "51115" to access various payment service functionality via text messages. Specifically, the invitation includes the keyword @bitsy using which the payee may request the home page menu from the payment service.

FIG. 3.7 shows a payer mobile device image displayed on the payer's mobile phone showing a notification text message (373) sent from the payment service in response to the text message (372) sent by the payer to the payment service. Specifically, the text message (372) includes the keyword @bitsy.pay which requests to make a payment to a new payee identified by the mobile phone number "917259183288" following the keyword @bitsy.pay. In particular, the payment amount is specified by the numerals "300" following the new payee's mobile phone number "917259183288". In this example, the new payee has never registered to use the payment service and may not even be aware of the payment service. Accordingly, the notification text message (373) notifies the payer that 300 satoshis has been reserved for the new payee. In addition, the notification text message (353) includes a reminder that the payer may reverse or cancel the payment if the new payee does not claim the payment.

FIG. 3.8 shows a payee mobile device image displayed on the new payee's mobile phone showing a notification text message (381) sent from the payment service. The notification text message (381) is sent using the new payee's mobile phone number "917259183288" specified by the payer as shown in FIG. 3.7 above. The notification text message (381) notifies the new payee regarding the payment sent from the payer. The notification text message (381) also includes an invitation for the new payee to use the payment service's phone number "51115" to claim the payment. Specifically, the invitation includes the keyword @bitsy.claim using which the payee may claim the payment.

FIG. 3.9 shows a payee mobile device image displayed on the new payee's mobile phone showing a reply text message (393) sent from the payment service in response to the text message (392) sent by the new payee. The reply text message (393) includes an instruction of how to use the keyword "C" to claim the payment. Accordingly, the new payee sends another text message (394) containing the keyword "C" to claim the payment. In response, the payment service replies with the notification text message (395) notifying the new payee that a new virtual payee account (referred to as the new bitsy wallet) has been set up and credited the claimed payment amount.

FIG. 3.10 shows a payer mobile device image displayed on the payer's mobile phone showing a reply text message (413) sent from the payment service in response to the text message (412) sent by the payer to the payment service. Specifically, the text message (412) includes the keyword @bitsy.transactions, which requests updated transaction status. In response, the reply text message (413) indicates that the payment previously sent to the new payee (shown in FIG. 3.7) has not been claimed. In addition, the reply text message (413) includes an instruction of how to reverse the unclaimed payment. Accordingly, the payer sends another text message (414) containing the keyword "R" to reverse the unclaimed payment. In response, the payment service replies with the notification text message (415) notifying the payer that the unclaimed payment has been reversed and credited back to the virtual payer account (i.e., payer's bitsy wallet).

FIG. 3.11 shows a payee mobile device image displayed on the payee's mobile phone showing a reply text message (423) sent from the payment service in response to the text message (422) sent by the payee. The text message (422) contains the keyword @bitsy.otp to request a one time password (OTP) from the payment service. The reply text message (423) includes the requested OTP and an instruction of how to withdraw bitcoins based on available balance in the virtual payee account (i.e., payee's bitsy wallet).

FIG. 3.12 shows a payment service image of a payee's computing device (e.g., a desktop computer or a tablet computer) when the payee accesses the payment service website to withdraw bitcoin based on available balance in the virtual payee account. Specifically, the payment service image shows a data entry field (431) where the payee enters the OTP obtained from the payment service (shown in FIG. 3.11 above). In addition, the payment service image shows two additional data entry fields (432) and (433) where the payee enters the withdrawal amount and the payee's Bitcoin network address, respectively. In particular, the payee's Bitcoin network address identifies the payee's Bitcoin wallet maintained in the Bitcoin network. Once these data entry fields (431), (432), and (433) are filled in, the payee may click the action button (434) to initiate the withdraw.

FIG. 3.13 shows a payee mobile device image displayed on the payee's mobile phone showing a notification text message (441) sent from the payment service to notify the payee that the withdrawal amount has been debited from the virtual payee account (i.e., payee's bitsy wallet) and transferred to the payee's Bitcoin wallet. Specifically, the withdrawal amount is debited from the virtual payee account as a book keeping entry while the withdrawal amount is transferred to the payee's Bitcoin wallet from the payment service's master wallet maintained in the Bitcoin network.

Although FIGS. 3.11-3.13 describes a scenario of a payee withdrawing bitcoin from virtual payee account to a payee's Bitcoin wallet, the scenario may be equally applicable to a payer withdrawing bitcoin from virtual payer account to a payer's Bitcoin wallet or other transactions.

Figure 4:
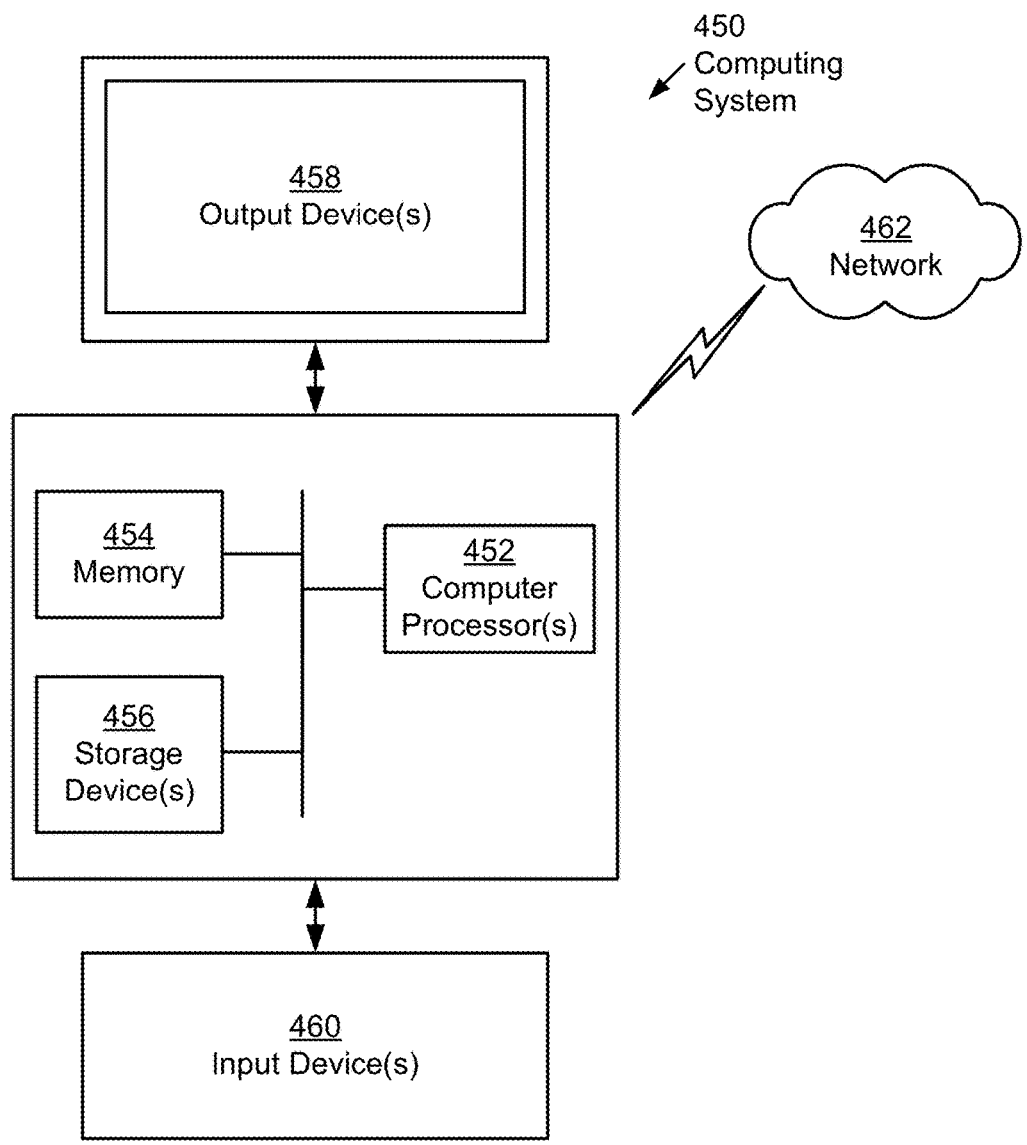
FIG. 4 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing payment, comprising:
receiving, by a payment service from a payer mobile device of a payer, a payment text message comprising a payment amount and an identifier of a payee mobile device of a payee;
validating the payment text message based at least on a payer balance of a virtual payer account maintained by the payment service for the payer;
creating, in response to the payment text message, a virtual payee account based on the identifier of the payee mobile device, wherein the payee does not have any prior account maintained by the payment service;
transferring, in response to creating the virtual payee account, the payment amount from the virtual payer account to the virtual payee account, wherein the payment amount is a fractional unit of virtual currency;

sending, by the payment service to the payee mobile device, a notification text message to notify the payee regarding a payee balance of the virtual payee account, wherein the payee balance is determined based at least on the payment amount;

aggregating, in the virtual payee account, the payment amount with other payment amounts which are fractional units of virtual currency;

performing, on a peer-to-peer virtual currency network that imposes a transaction fee, a virtual currency transaction linked to the virtual payee account, upon determining that the transaction fee is within a pre-determined acceptable percentage of a value associated with a full unit of virtual currency, wherein the peer-to-peer virtual currency network includes a peer-to-peer shared database storing the block chain of the Bitcoin network and a master Bitcoin wallet and a payee Bitcoin wallet;

updating, by the payment service and in response to a depositing, the payer balance of the virtual payer account, wherein the depositing deposits a deposit amount to a one-time Bitcoin payer wallet maintained by the peer-to-peer virtual currency network for the payment service; and transferring the deposit amount in the one-time Bitcoin payer wallet to a master wallet that is maintained by the peer-to-peer virtual currency network, wherein the master wallet stores a digitally signed message broadcasted to the peer-to-peer virtual currency network representing the deposit amount in virtual currency.

2. The method of claim 1, further comprising:

verifying, by the payment service subsequent to updating the payer balance and prior to transferring the payment amount, that the payer balance is sufficient for transferring the payment amount, wherein validating the payment text message is based at least on the verifying.

3. The method of claim 1, further comprising:

receiving, by the payment service from the payer mobile device, an unanswered voice call within a pre-determined time period subsequent to receiving the payment text message, wherein validating the payment text message is further based on receiving the unanswered voice call within the pre-determined time period.

4. The method of claim 1, further comprising:

receiving, by the payment service, a withdrawal request comprising a withdrawal amount and an identifier of a payee wallet maintained by a peer-to-peer virtual currency network for the payee;

transferring, by the payment service, the withdrawal amount to the payee wallet from a master wallet that is maintained by a peer-to-peer virtual currency network for the payment service; and updating, by the payment service and in response to transferring the withdrawal amount, the payee balance of the virtual payee account based at least on the withdrawal amount.

5. The method of claim 4, further comprising:

sending, by the payment service to the payee mobile device, an one-time password for the virtual payee account, wherein the withdrawal request further comprises the one-time password; and retrieving, by the payment service, the one-time password from the withdrawal request to identify the virtual payee account for updating the payee balance.

6. The method of claim 1, wherein the depositing is made by the payer using a view in a graphical user interface (GUI).

7. The method of claim 1, wherein the master wallet comprises a peer-to-peer file sharing data structure assigned to the payment service for storing virtual currency of the payment service.

8. A system for processing payment, comprising:

a processor and memory;

a payment service executing on the processor, with instructions stored in memory, configured to:

receive a payment text message from a payer mobile device of a payer, wherein the payment text message comprises a payment amount and an identifier of a payee mobile device of a payee;

validate the payment text message based at least on a payer balance of a virtual payer account maintained by the payment service for the payer;

create, in response to the payment text message, a virtual payee account based on the identifier of the payee mobile device, wherein the payee does not have any prior account maintained by the payment service;

transfer, in response to creating the virtual payee account, the payment amount from the virtual payer account to the virtual payee account, wherein the payment amount is a fractional unit of virtual currency;

send, by the payment service to the payee mobile device, a notification text message to notify the payee regarding a payee balance of the virtual payee account, wherein the payee balance is determined based at least on the payment amount;

aggregate, in the virtual payee account, the payment amount with other payment amounts which are fractional units of virtual currency;

perform, on a peer-to-peer virtual currency network that imposes a transaction fee, a virtual currency transaction linked to the virtual payee account, upon determining that the transaction fee is within a pre-determined acceptable percentage of a value associated with a full unit of virtual currency, wherein the peer-to-peer virtual currency network includes a peer-to-peer shared database storing the block chain of the Bitcoin network and a master Bitcoin wallet and a payee Bitcoin wallet;

update, by the payment service and in response to a depositing, the payer balance of the virtual payer account, wherein the depositing deposits a deposit amount to a one-time Bitcoin payer wallet maintained by the peer-to-peer virtual currency network for the payment service; and transfer the deposit amount in the one-time Bitcoin payer wallet to a master wallet maintained by the peer-to-peer virtual currency network, wherein the master wallet stores a digitally signed message broadcasted to the peer-to-peer virtual currency network representing the deposit amount in virtual currency.

9. The system of claim 8, wherein the payment service is further configured to:

verify, subsequent to updating the payer balance and prior to transferring the payment amount, that the payer balance is sufficient for transferring the payment amount, wherein validating the payment text message is based at least on the verifying.

10. The system of claim 8, the payment service further configured to: receive, from the payer mobile device, an unanswered voice call within a pre-determined time period subsequent to receiving the payment text message, wherein validating the payment text message is further based on receiving the unanswered voice call within the pre-determined time period.

11. The system of claim 8, the payment service further configured to:
  receive a withdrawal request comprising a withdrawal amount and an identifier of a payee wallet maintained by a peer-to-peer virtual currency network for the payee;
  transfer the withdrawal amount to the payee wallet from a master wallet maintained by the peer-to-peer virtual currency network for the payment service; and
  update, in response to transferring the withdrawal amount, the payee balance of the virtual payee account based at least on the withdrawal amount.

12. The system of claim 11, the payment service further configured to:
  send, to the payee mobile device, an one-time password for the virtual payee account, wherein the withdrawal request further comprises the one-time password; and
  retrieve the one-time password from the withdrawal request to identify the virtual payee account for updating the payee balance.

13. The system of claim 8, wherein the depositing is made by the payer using a view in a graphical user interface (GUI).

14. The system of claim 8, wherein the master wallet comprises a peer-to-peer file sharing data structure assigned to the payment service for storing virtual currency of the payment service.

15. A non-transitory computer readable medium storing instructions for processing payment, the instructions, when executed by a computer processor, comprising functionality for:
  receiving, by a payment service from a payer mobile device of a payer, a payment text message comprising a payment amount and an identifier of a payee mobile device of a payee;
  validating the payment text message based at least on a payer balance of a virtual payer account maintained by the payment service for the payer;
  creating, in response to the payment text message, a virtual payee account based on the identifier of the payee mobile device, wherein the payee does not have any prior account maintained by the payment service;
  transferring, in response to creating the virtual payee account, the payment amount from the virtual payer account to the virtual payee account, wherein the payment amount is a fractional unit of virtual currency; and
  sending, by the payment service to the payee mobile device, a notification text message to notify the payee regarding a payee balance of the virtual payee account, wherein the payee balance is determined based at least on the payment amount;
  aggregating, in the virtual payee account, the payment amount with other payment amounts which are fractional units of virtual currency; and
  performing, on a peer-to-peer virtual currency network that imposes a transaction fee, a virtual currency transaction linked to the virtual payee account, upon determining that the transaction fee is within a pre-determined acceptable percentage of a value associated with a full unit of virtual currency, wherein the peer-to-peer virtual currency network includes a peer-to-peer shared database storing the block chain of the Bitcoin network and a master Bitcoin wallet and a payee Bitcoin wallet;
  updating, by the payment service and in response to a depositing, the payer balance of the virtual payer account, wherein the depositing deposits a deposit amount to a one-time Bitcoin payer wallet maintained by the peer-to-peer virtual currency network for the payment service; and
  transferring the deposit amount in the one-time Bitcoin payer wallet to a master wallet maintained by the peer-to-peer virtual currency network, wherein the master wallet stores a digitally signed message broadcasted to the peer-to-peer virtual currency network representing the deposit amount in virtual currency.

16. The non-transitory computer readable medium of claim 15, the instructions, when executed by the computer processor, further comprising functionality for:
  verifying, by the payment service subsequent to updating the payer balance and prior to transferring the payment amount, that the payer balance is sufficient for transferring the payment amount,
  wherein validating the payment text message is based at least on the verifying.

17. The non-transitory computer readable medium of claim 15, the instructions, when executed by the computer processor, further comprising functionality for:
  receiving, by the payment service from the payer mobile device, an unanswered voice call within a pre-determined time period subsequent to receiving the payment text message, wherein validating the payment text message is further based on receiving the unanswered voice call within the pre-determined time period.

18. The non-transitory computer readable medium of claim 15, the instructions, when executed by the computer processor, further comprising functionality for:
  receiving, by the payment service, a withdrawal request comprising a withdrawal amount and an identifier of a payee wallet maintained by a peer-to-peer virtual currency network for the payee;
  transferring, by the payment service, the withdrawal amount to the payee wallet from a master wallet that is maintained by a peer-to-peer virtual currency network for the payment service; and
  updating, by the payment service and in response to transferring the withdrawal amount, the payee balance of the virtual payee account based at least on the withdrawal amount.

19. The non-transitory computer readable medium of claim 18, the instructions, when executed by the computer processor, further comprising functionality for:
  sending, by the payment service to the payee mobile device, an one-time password for the virtual payee account, wherein the withdrawal request further comprises the one-time password; and
  retrieving, by the payment service, the one-time password from the withdrawal request to identify the virtual payee account for updating the payee balance.

20. The non-transitory computer readable medium of claim 15, wherein the depositing is made by the payer using a view in a graphical user interface (GUI).

21. The non-transitory computer readable medium of claim 15, wherein the master wallet comprises a peer-to-peer file sharing data structure assigned to the payment service for storing virtual currency of the payment service.

* * * * *